United States Patent
Nishimura et al.

(10) Patent No.: US 10,300,912 B2
(45) Date of Patent: May 28, 2019

(54) COLLISION AVOIDANCE APPARATUS

(71) Applicant: Toyota Jidosha Kabushiki Kaisha, Toyota-shi, Aichi-ken (JP)

(72) Inventors: Motoki Nishimura, Susono (JP); Kotaro Saiki, Susono (JP); Shinya Nishida, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 70 days.

(21) Appl. No.: 15/631,643

(22) Filed: Jun. 23, 2017

(65) Prior Publication Data

US 2017/0369054 A1 Dec. 28, 2017

(30) Foreign Application Priority Data

Jun. 24, 2016 (JP) ................... 2016-125942

(51) Int. Cl.
*B60W 30/09* (2012.01)
*B60W 30/095* (2012.01)

(52) U.S. Cl.
CPC .......... *B60W 30/09* (2013.01); *B60W 30/095* (2013.01); *B60W 2550/10* (2013.01); *B60W 2720/10* (2013.01); *B60W 2720/24* (2013.01); *B60W 2900/00* (2013.01)

(58) Field of Classification Search
None
See application file for complete search history.

(56) References Cited

U.S. PATENT DOCUMENTS

| | | | | |
|---|---|---|---|---|
| 7,835,865 | B2* | 11/2010 | Okazaki | B60R 21/0134 340/435 |
| 2008/0097699 | A1* | 4/2008 | Ono | B60R 21/0134 701/300 |
| 2011/0246071 | A1* | 10/2011 | Tsunekawa | G08G 1/166 701/301 |

FOREIGN PATENT DOCUMENTS

JP 2013-133070 A 7/2013

* cited by examiner

*Primary Examiner* — Thomas G Black
*Assistant Examiner* — Demetra R Smith-Stewart
(74) *Attorney, Agent, or Firm* — Dinsmore & Shohl LLP

(57) ABSTRACT

A collision avoidance apparatus includes an obstacle detection section for detecting an obstacle, a collision avoidance section which performs collision avoidance assist control, and an avoidance processing start section for causing the collision avoidance section to start the collision avoidance assist control. In the case where the obstacle is a continuous obstacle, the timing of starting the collision avoidance assist control is delayed as compared with the case where the obstacle is not a continuous obstacle. Further, the greater the degree of gentleness of the inclination of the continuous obstacle, the greater the amount by which the timing of starting the collision avoidance assist control is delayed.

4 Claims, 6 Drawing Sheets

COLLISION AVOIDANCE APPARATUS

CROSS-REFERENCE TO RELATED APPLICATIONS

The present disclosure claims priority to Japanese Patent Application No. 2016-125942 filed on Jun. 24, 2016 which is incorporated herein by reference including the specification, drawings, and abstract.

BACKGROUND

Technical Field

The present disclosure relates to a collision avoidance apparatus which operates, when a vehicle is about to collide with an obstacle, so as to avoid the collision with the obstacle by decreasing the speed of the vehicle and/or turning the vehicle.

Description of the Related Art

Japanese Patent Application Laid-Open (kokai) No. 2013-133070 discloses a collision avoidance apparatus (hereinafter also referred to as the "conventional apparatus"). When the conventional apparatus detects a target (obstacle) present in the heading direction of a vehicle on the basis of the output of a sensor (obstacle sensor) such as a millimeter wave radar or a camera, the conventional apparatus controls the brake system of the vehicle so as to avoid collision with the obstacle.

The conventional apparatus determines that the target is an obstacle when a "lapping ratio" is greater than a predetermined threshold. The lapping ratio is the ratio of the distance (lateral distance) between the "center of the detected target in the lateral direction (the lateral direction (left-right direction) of the vehicle)" and the "center of the vehicle in the lateral direction" to the width of the vehicle (namely, "the lateral distance"/"the vehicle width"). In addition, the conventional apparatus executes collision avoidance assist control which causes the brake system of the vehicle to generate a braking force when a predicted time (collision time) before the vehicle collides with the obstacle becomes shorter than a predetermined threshold.

Incidentally, in some cases, the obstacle present in the heading direction of the vehicle may be a continuous structure such as a side wall or a guard rail extending along a road. In the case where the line of intersection between the ground surface (road surface) and a surface (facing surface) of the obstacle which faces the vehicle is long in the lateral direction of the vehicle and is oblique in relation to the lateral direction of the vehicle, that obstacle is also called a "continuous obstacle."

When the magnitude of an "intersection line inclination" which is an acute angle formed between the intersection line and a straight line (reference line) extending in the lateral direction of the vehicle is large (namely, when the inclination of the continuous obstacle (the facing surface thereof) as viewed from a driver is gentle), the amount of operation of the steering wheel (the absolute value of steering angle) required to avoid collision is small as compared with the case where the magnitude of the intersection line inclination is small.

In other words, the larger the magnitude of the intersection line inclination, the easier the avoidance of collision with the continuous obstacle by a driver's turning and/or deceleration operation (hereinafter also referred to as "collision avoidance operation" collectively). Therefore, in the case where a continuous obstacle is present in the heading direction of the vehicle, there is a tendency that the larger the magnitude of the intersection line inclination, the greater the delay of the timing at which the driver starts the collision avoidance operation.

Meanwhile, in the case where the driver has become aware of the continuous obstacle present in the heading direction, the driver is highly likely to feel an unnatural sensation if the conventional apparatus starts the collision avoidance assist control prior to the timing at which the driver starts the collision avoidance operation. However, the conventional apparatus does not execute processing of determining whether or not the obstacle present in the heading direction of the vehicle is a continuous obstacle and adjusting the start timing of the collision avoidance assist control in accordance with the magnitude of the intersection line inclination if the obstacle is a continuous obstacle. In other words, when the conventional apparatus avoids collision with the continuous obstacle by the collision avoidance assist control, the conventional apparatus does not taken into consideration the timing at which the driver starts the collision avoidance operation.

SUMMARY

In view of the foregoing, it is one object of the present disclosure to provide a collision avoidance apparatus which starts the collision avoidance assist control at a proper timing when a continuous obstacle is present in the heading direction of a vehicle, to thereby increase the possibility of avoidance of situations in which a driver feels an unnatural sensation.

A collision avoidance apparatus according to the present disclosure which achieves the above-described object (hereinafter also referred to as the "apparatus of the present disclosure") includes an obstacle detection section, a collision avoidance section, an avoidance processing start section, and a time threshold adjustment section (a radar unit 30 and a collision avoidance ECU 20).

The obstacle detection section detects an obstacle present in a heading direction of a vehicle (10).

The collision avoidance section performs collision avoidance assist control (step 650 to step 660 of FIG. 6) so as to avoid collision with the obstacle, the collision avoidance assist control including at least one of control of decreasing the speed (Vs) of the vehicle and control of turning the vehicle.

The avoidance processing start section causes the collision avoidance section to start the collision avoidance assist control when a collision time (Tc) which is a time remaining before the vehicle collides with the obstacle becomes smaller than a predetermined time threshold (Tth) ("Yes" determination in step 645 of FIG. 6 and "Yes" determination in step 670 of FIG. 6).

The time threshold adjustment section performs time threshold adjustment processing when the obstacle is a continuous obstacle ("Yes" determination in step 620 of FIG. 6).

The continuous obstacle is an obstacle for which a condition that a distance between a "specific point" on a "intersection line (Lj)" between a road surface and a facing surface of the obstacle which faces the vehicle and a "reference line" which is a straight line extending in a lateral direction of the vehicle and located on the vehicle side of the facing surface increases as the specific point moves in a "specific direction" which is one of rightward and leftward directions of the vehicle is satisfied when the specific point is located between an "obstacle-side collision point (Ps)" which is a point on the obstacle which first collides with the vehicle if the vehicle travels while maintaining a steering state (a state represented by a steering angle θs) of the vehicle at the present point in time, and a point which is separated from the obstacle-side collision point in the specific direction along the intersection line by a predetermined distance (an inside length threshold Lith).

The time threshold adjustment processing sets the time threshold (sets an adjusted time threshold Tthr) such that the time threshold becomes smaller than that set in the case where the obstacle is not the continuous obstacle and such that the larger the magnitude of an intersection line inclination which is an acute angle formed between the intersection line and the reference line, the smaller the value to which the time threshold is set.

The time threshold (adjusted time threshold) for the case where the obstacle is a continuous obstacle becomes smaller as compared with that for the case where the obstacle is not a continuous obstacle. Accordingly, in the case where the obstacle is a continuous obstacle, the timing at which the collision avoidance assist control is started is delayed as compared with the case where the obstacle is not a continuous obstacle.

In addition, the adjusted time threshold is set such that the greater the magnitude of the intersection line inclination (namely, the greater the degree of easiness of avoidance of collision with the continuous obstacle by a driver), the smaller the value to which the adjusted time threshold is set. Therefore, the greater the magnitude of the intersection line inclination, the larger the amount by which the timing at which the collision avoidance assist control is started is delayed.

Therefore, according to the present avoidance apparatus, the timing at which the collision avoidance assist control is started is adjusted depending on whether or not the obstacle is a continuous obstacle and in accordance with the inclination of the continuous obstacle. Thus, it is possible to increase the possibility of avoidance of situations in which the driver feels an unnatural sensation because the collision avoidance assist control is started before the driver starts a collision avoidance operation.

In one mode of the apparatus of the present disclosure, when the time threshold adjustment section performs the time threshold adjustment processing, the time threshold adjustment section obtains a collision point lapping ratio (Rw=ΔPx/Lw) and sets the time threshold such that the time threshold increases with the collision point lapping ratio (step 640 of FIG. 6), the collision point lapping ratio being a ratio, to a width (Lw) of a body of the vehicle, of a distance (collision position deviation ΔPx) in the lateral direction of the vehicle between the vehicle-side collision point and a contact point (turn collision position Pv) on the intersection line which is formed when a circle (imaginary turn circle Ca1a) is moved in a longitudinal direction of the vehicle such that the circle comes into contact with the intersection line, the circle having a radius equal to a turning radius (imaginary turn radius Rv) of the vehicle which turns while maintaining the vehicle speed at the present point in time such that an inertial force acting on the vehicle in the lateral direction becomes equal to a predetermined reference inertial force (Fbx), the circle having a center located on a straight line (La) obtained by extending a rear wheel axle of the vehicle, and the circle passing through a vehicle-side collision point (Pc) which is a point on the vehicle which first collides with the obstacle-side collision point.

As described above, the avoidance of collision with a continuous obstacle is easier for a driver as compared with the avoidance of collision with an obstacle which is not a continuous obstacle. However, when a driver driving a vehicle having a large vehicle width (length of the body in the lateral direction) avoids collision with a continuous obstacle, a larger psychological burden is imposed on the driver as compared with the case where the driver drives a vehicle having a small vehicle width and avoids collision with a continuous obstacle.

Accordingly, even when the inclination of the continuous obstacle (namely, the magnitude of the intersection line inclination) and the time remaining before collision with the obstacle are the same, there is a tendency that the greater the vehicle width, the earlier the timing at which the driver starts the collision avoidance operation. Therefore, the driver is highly likely to feel that the start of the collision avoidance assist control is late unless the timing of starting the collision avoidance assist control is changed in accordance with the vehicle width such that the greater the vehicle width, the earlier the timing at which the collision avoidance assist control is started.

The collision point lapping ratio is a value whose magnitude changes such that the greater the intersection line inclination, the smaller the magnitude, and the greater the vehicle width, the smaller the magnitude. For example, the adjusted time threshold can be calculated by multiplying the collision point lapping ratio by a predetermined constant of proportionality or by adding a predetermined constant to a value obtained by multiplying the collision point lapping ratio by a predetermined constant of proportionality. Therefore, according to the present mode, the adjusted time threshold can be determined through simple computation.

Further, in another mode of the apparatus of the present disclosure, in the case where the vehicle is turning when the time threshold adjustment section executes the time threshold adjustment processing, (1) when the direction of the turning is the same as the specific direction, the time threshold adjustment section assumes that the magnitude of the intersection line inclination is equal to a "value obtained by adding a yaw angle difference (Δθy) to the magnitude of the intersection line inclination, the yaw angle difference being a difference between a yaw angle of the vehicle at the time when the vehicle collides with the obstacle-side collision point and a yaw angle of the vehicle at the present point in time," and (2) when the direction of the turning is not the same as the specific direction, the time threshold adjustment section assumes that the magnitude of the intersection line inclination is equal to a "value obtained by subtracting the yaw angle difference from the magnitude of the intersection line inclination."

During execution of the time threshold adjustment processing by the apparatus of the present disclosure, there may arise a case where although the driver having had already become aware of the presence of the continuous obstacle has started to turn the vehicle so as to avoid collision with that obstacle, the magnitude of the steering angle has failed to reach a magnitude sufficient for avoiding the collision with that obstacle. In such a case, the magnitude of the intersection line inclination increases as the vehicle travels (namely, the inclination of the continuous obstacle becomes gentle with elapse of time. See FIG. 5). Therefore, the psychological burden on the driver decreases as compared with the case where the vehicle travels straight. As a result, the timing at which the driver starts an operation of further increasing the amount of change in the yaw angle (turning angle) per unit time (so-called yaw rate) and/or an operation of decelerating the vehicle (namely, the collision avoidance operation) is highly likely to become late as compared with the case where the vehicle travels straight.

According to the present mode, the greater the magnitude of the yaw rate, the greater the value of the adjusted time threshold, and the greater the amount by which the timing of starting the collision avoidance assist control is delayed. Therefore, according the present mode, even in the case where the vehicle is turning when the time threshold adjustment processing is executed, the adjusted time threshold is set properly, whereby the frequency of occurrence of a phenomenon in which the collision avoidance assist control is started before the driver starts the collision avoidance operation can be decreased without fail.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION OF THE EMBODIMENTS

A collision avoidance apparatus according to an embodiment of the present disclosure (hereinafter also referred to as the "present avoidance apparatus") will now be described with reference to the drawings. The present avoidance apparatus is applied to a vehicle 10 shown in FIG. 1. The vehicle 10 includes a collision avoidance ECU 20, an engine ECU 50, and a brake ECU 60. "ECU" stands for an electronic control unit.

Figure 2:
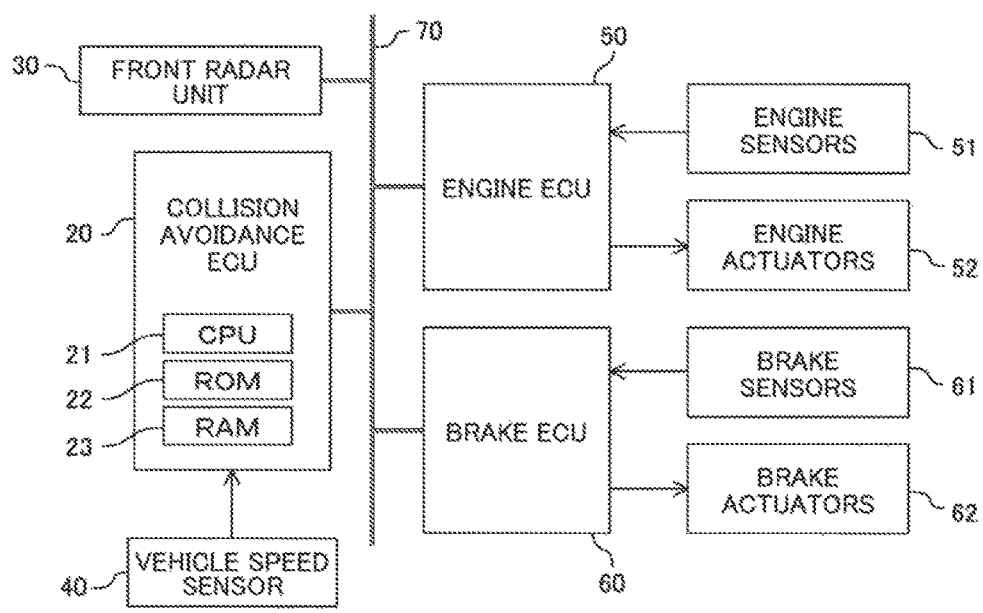
FIG. 2 is a detailed diagram of the present avoidance apparatus.

As shown in FIG. 2, the collision avoidance ECU 20 includes a CPU 21, a ROM 22, and a RAM 23. The CPU 21 performs reading of data, numerical computation, outputting of computation results, etc., by executing predetermined programs (routines). The ROM 22 stores programs executed by the CPU 21, lookup tables (maps), etc. The RAM 23 stores data temporarily. Like the collision avoidance ECU 20, each of the engine ECU 50 and the brake ECU 60 includes a CPU, a ROM, and a RAM.

The collision avoidance ECU 20, a radar unit 30, the engine ECU 50, and the brake ECU 60 can perform data communications (can exchange data) through a communication/sensor CAN (controller area network) 70.

Figure 1:
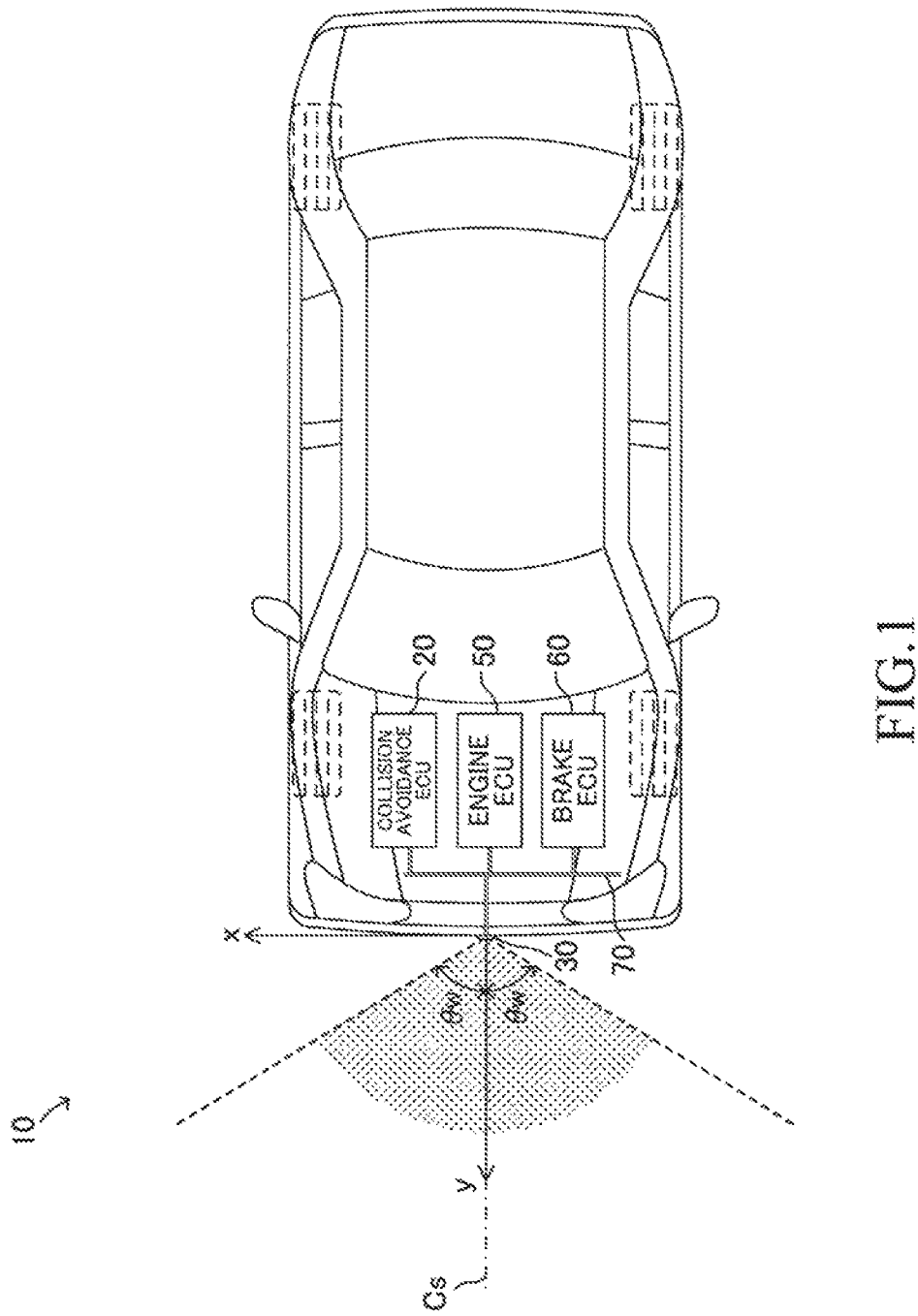
FIG. 1 is a schematic view of a vehicle to which a collision avoidance apparatus according to an embodiment of the present disclosure (present avoidance apparatus) is applied.

The radar unit (front radar unit) 30 is mounted on the vehicle 10 and includes a transmission section, a reception section, and a processing section, which are not shown. As shown in FIG. 1, the radar unit 30 is disposed at the front end of the vehicle 10 to be located at the center of the vehicle 10 in the lateral direction thereof (the vehicle width direction). The transmission section transmits a millimeter wave (electromagnetic wave whose frequency falls within the range of 30 GHz to 300 GHz). The millimeter wave transmitted by the transmission section will be also referred to as the "transmission wave." The transmission section transmits the transmission wave in such a manner that the frequency of the transmission wave is increased and decreased alternatingly and the amount of change of the frequency per unit time is constant. The transmission wave has a center axis Cs extending in the heading direction of the vehicle 10 and propagates while spreading rightward and leftward from the center axis Cs with a predetermined spread angle θw.

Notably, in the following description, the direction of the center axis Cs (namely, the longitudinal direction (front-rear direction) of the vehicle 10) is defined as a y-axis, and a direction perpendicular to the center axis Cs (namely, the lateral direction of the vehicle 10) is defined as an x-axis. The y coordinate assumes a positive value in the forward direction of the vehicle 10 and assumes a negative value in the rearward direction of the vehicle 10. The x coordinate assumes a positive value in the rightward direction of the vehicle 10 and assumes a negative value in the leftward direction of the vehicle 10. The center of the front end of the vehicle 10 in the vehicle width direction is the origin where x=0 and y=0.

The reception section of the radar unit 30 has a plurality of reception antennas (not shown) provided herein. A portion of the transmission wave is reflected by a target (for example, an obstacle and/or a vehicle other than the vehicle 10) and is received by the reception antenna. The reflection wave of the transmission wave which is received by the reception section is also referred to as the "reception wave." Each time a predetermined time elapses, the processing section of the radar unit 30 obtains the position where the target is present and the relative speed of the target at that position on the basis of the transmission wave and the reception wave.

More specifically, the processing section obtains a plurality of beat signals by mixing the reception waves received by the reception antennas with the transmission wave. The processing section obtains the distance between the vehicle 10 and the target and the relative speed of the target on the basis of the frequencies and phases of the beat signals. Further, the processing section obtains the direction in which the target is present on the basis of the phase differences among the plurality of beat signals. In the present example, at intervals of a predetermined angle (interval angle θi), the processing section determines whether or not a target is present. In other words, the directional (angular) resolution of target search by the radar unit 30 is equal to the interval angle θi.

When a target (more specifically, a portion of the target) is present at a certain angle (in a certain direction) in relation to the vehicle 10, the processing section obtains the distance and relative speed of the target present at that angle (hereinafter also referred to as the "search angle"), and calculates the lateral distance Dx, the relative lateral speed Vx, the longitudinal distance Dy, and the relative longitudinal speed Vy on the x-y coordinate plane.

The relative lateral speed Vx is the amount of change in the lateral distance Dx per unit time. The relative longitudinal speed Vy is the amount of change in the longitudinal distance Dy per unit time. The combination of the lateral distance Dx, the relative lateral speed Vx, the longitudinal distance Dy, and the relative longitudinal speed Vy obtained by the processing section of the radar unit 30 will be also referred to as a "target element." A set of target elements corresponding to one target will be also referred to as "target information."

When obtainment of the target information is completed, the processing section of the radar unit 30 obtains a set of target elements for each target. More specifically, in the case where a target corresponding to a certain search angle (search angle A) is present, a target corresponding to a search angle B which is greater than the search angle A by the interval angle θi (i.e., B=A+θi) is not present, and a target corresponding to a search angle C which is obtained by adding to the search angle A the product of the interval angle θi and n (n is an integer equal to or greater than 2) (C=A+θi×n) is present, the processing section determines that the "target element corresponding to the search angle A" and the "target element corresponding to the search angle C" correspond to targets which are different from each other.

In addition, in the case where the distance between the target element corresponding to the search angle A and the target element corresponding to the search angle B is greater than a predetermined value, the processing section determines that the "target element corresponding to the search angle A" and the "target element corresponding to the search angle B" correspond to targets which are different from each other. Further, in the case where the difference between the "distance between the vehicle 10 and the target element corresponding to the search angle A" and the "distance between the vehicle 10 and the target element corresponding to the search angle B" does not fall within the range between predetermined lower and upper limits, the processing section determines that the "target element corresponding to the search angle A" and the "target element corresponding to the search angle B" correspond to targets which are different from each other.

In the case where a plurality of targets are present, the processing section obtains a plurality of pieces of the target information. The processing section sends the target information to the collision avoidance ECU 20 through the CAN 70. In the case where a plurality of targets are present, the processing section sends to the collision avoidance ECU 20 pieces of the target information corresponding to the targets.

Referring back to FIG. 2, the collision avoidance ECU 20 receives a signal from a vehicle speed sensor 40. The vehicle speed sensor 40 detects the speed Vs of the vehicle 10 and outputs a signal representing the vehicle speed Vs.

The engine ECU 50 is connected to a plurality of engine sensors 51 and receives detection signals from these sensors. The engine sensors 51 detect operation state quantities of an unillustrated "gasoline-fuel-injection-type spark ignition engine which is a drive source of the vehicle 10." The engine sensors 51 include an accelerator pedal operation amount sensor, a throttle valve opening sensor, an engine rotational seed sensor, an intake air amount sensor, etc.

Further, the engine ECU 50 is connected to engine actuators 52 such as a throttle valve actuator and a fuel injection valve. The engine ECU 50 changes the torque Tq generated by the engine by driving the engine actuators 52.

The brake ECU 60 is connected to a plurality of brake sensors 61 and receives detection signals from these sensors. The brake sensors 61 detect parameters which are used for controlling an unillustrated "brake system (hydraulic friction brake system) mounted on the vehicle 10." The brake sensors 61 includes a brake pedal operation amount sensor, wheel speed sensors for detecting the rotational speeds of the wheels, etc.

Further, the brake ECU 60 is connected to brake actuators 62. The brake actuators 62 are oil pressure control actuators. The brake actuators 62 are disposed in a hydraulic circuit between a master cylinder which pressurizes working oil in accordance with brake pedal force and friction brakes provided in the wheels and including well known wheel cylinders (none of the hydraulic circuit, the master cylinder, and the friction brakes is illustrated). The brake actuators 62 adjust the oil pressure supplied to the wheel cylinders. The brake ECU 60 drives the brake actuators 62 so as to generate a brake force (frictional brake force) Bf to be applied to the wheels.

Collision Avoidance Assist Control:

The collision avoidance ECU 20 detects an obstacle present in the heading direction of the vehicle 10 on the basis of the target information obtained by the radar unit 30. When an obstacle is detected, the collision avoidance ECU 20 obtains a collision time Tc which is a time remaining before the vehicle 10 collides with the obstacle in the case where the heading direction of the vehicle 10 (in the present example, the steering angle θs of a steering wheel (not shown) of the vehicle 10) and the vehicle speed Vs does not change.

When the collision time Tc becomes shorter than a time threshold Tth, the collision avoidance ECU 20 executes collision avoidance assist control. More specifically, the collision avoidance ECU 20 sets a target value of the torque Tq (target torque Tq*) to "0" and transmits the target torque Tq* to the engine ECU 50. The engine ECU 50 controls the engine actuators 52 such that the actual torque Tq approaches the target torque Tq* received from the collision avoidance ECU 20. In addition, the collision avoidance ECU 20 sets a target value of deceleration Dc (target deceleration Dc*) such that the vehicle 10 stops before the obstacle and transmits the target deceleration Dc* to the brake ECU 60. The brake ECU 60 controls the brake actuators 62 such that the actual deceleration Dc approaches the target deceleration Dc* received from the collision avoidance ECU 20.

As a result, collision between the vehicle 10 and the obstacle is avoided even when a driver does not perform operation of the steering wheel of the vehicle 10 for avoiding the collision with the obstacle (avoidance operation by turning) and/or operation for decreasing the vehicle speed Vs (avoidance operation by braking) (namely, the driver does not perform "collision avoidance operation").

The time threshold Tth is set such that the collision avoidance assist control is started at a point in time slightly later than the "timing at which a typical driver having become aware of the obstacle present in the heading direction of the vehicle 10 starts the collision avoidance operation." Therefore, there can be avoided situations in which "the collision avoidance assist control is performed before the driver having become aware of the obstacle starts the collision avoidance operation, and as a result, the driver feels an unnatural sensation."

The collision time Tc at the point in time when the driver starts the collision avoidance operation will be also referred to as "operation start remaining time Tr." Namely, the time threshold Tth is set to a value slightly smaller than the operation start remaining time Tr.

Incidentally, when the obstacle is long in the lateral direction (namely, the x-axis direction) and the intersection line Lj between the ground surface (road surface) and a surface (facing surface) of the obstacle which faces the vehicle 10 is oblique with respect to the x-axis direction, the collision avoidance ECU 20 determines that the obstacle is a "continuous obstacle." A side wall and a guard rail extending along a road are examples of the continuous obstacle. The facing surface is a surface which constitutes a portion of the continuous obstacle which is visible from the driver of the vehicle 10. The method by which the collision avoidance ECU 20 determines "whether or not the obstacle is a continuous obstacle" will be described in detail later.

Figure 3:
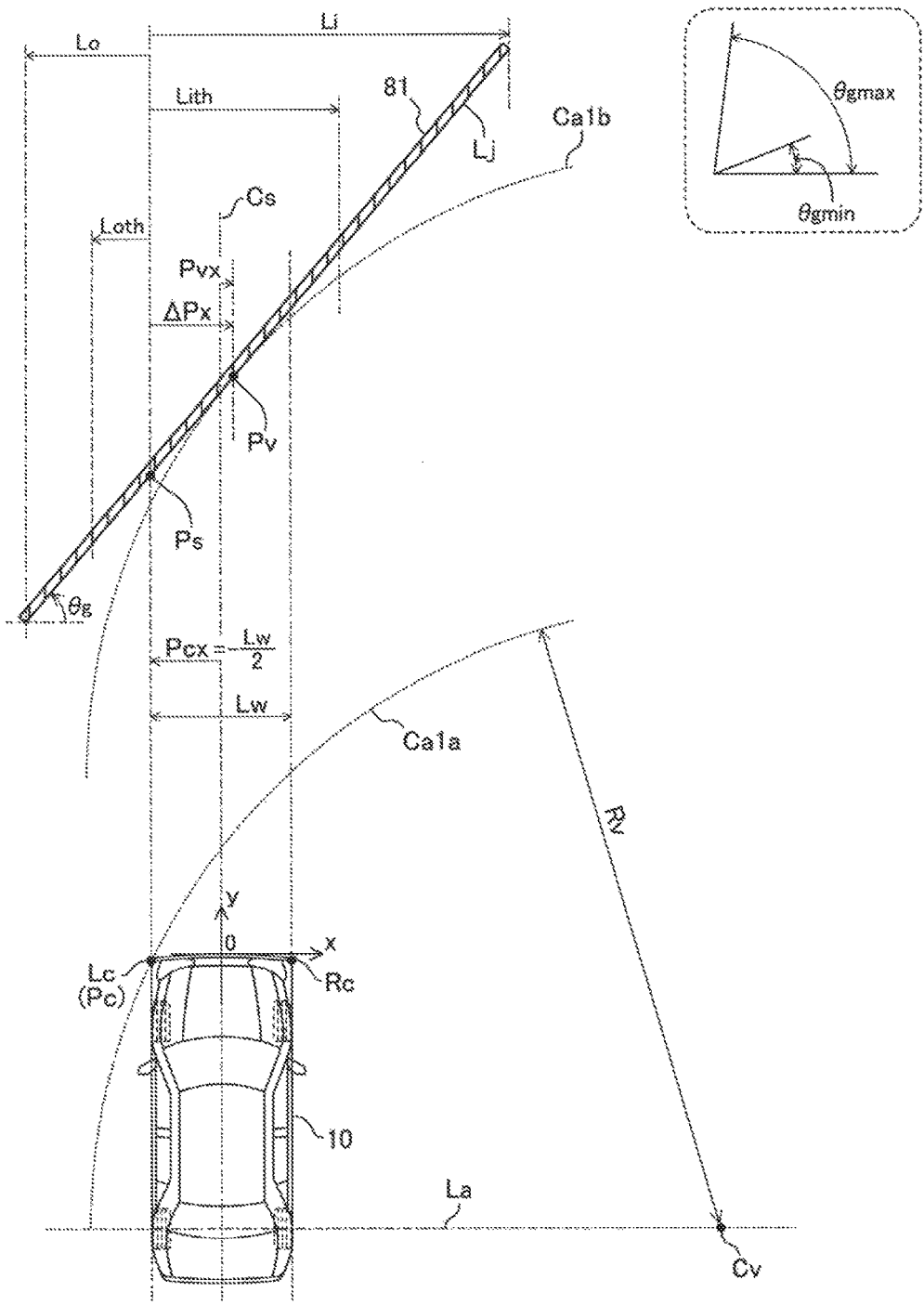
FIG. 3 is a view showing an exemplary continuous obstacle.

As shown in FIG. 3, the intersection line Lj corresponding to the continuous obstacle present in the heading direction of the vehicle 10 can be approximated by a straight line expressed by y=ax+b (where the intersection line inclination a is a constant other than "0" and the intersection line intercept b is a positive constant). The acute angle formed between the intersection line Lj approximated by a straight line and the x-axis will be referred to as an intersection line inclination angle $\theta g$ ($-90°<\theta g<90°$; however, when the intersection line inclination a>0, the intersection line inclination angle $\theta g>0$, and when the intersection line inclination a<0, the intersection line inclination angle $\theta g<0$). A relation of $a=\tan(\theta g)$ holds. Accordingly, the greater the absolute value of the intersection line inclination angle $\theta g$, the greater the absolute value of the intersection line inclination a.

In the case where the inclination of the continuous obstacle present in the heading direction of the vehicle 10 is gentle (namely, the absolute value of the intersection line inclination a is relatively large), a "turn radius (avoidance turn radius) at the time of performance of the avoidance operation by turning" which is required to avoid collision is larger as compared with the case where the inclination is steep (namely, the absolute value of the intersection line inclination a is relatively small). In other words, the amount of a change in the steering angle $\theta s$ necessary for the avoidance operation by turning (namely, the operation amount of the steering wheel (not shown) of the vehicle 10) is small.

Therefore, in the case where the inclination of the continuous obstacle is gentle, the psychological burden on the driver is smaller, as compared with the case where the inclination of the continuous obstacle is steep. In other words, the driver can more easily avoid collision with a continuous obstacle whose inclination is gentle, as compared with the case where the driver avoids collision with a continuous obstacle whose inclination is steep.

Therefore, there is a tendency that the gentler the inclination of the continuous obstacle, the greater the delay of the timing at which the driver starts the collision avoidance operation. Namely, the gentler the inclination of the continuous obstacle, the shorter the operation start remaining time Tr.

Incidentally, when the width Lw of the vehicle 10 (namely, the length of the body of the vehicle 10 in the x-axis direction) is large, a larger psychological burden is imposed on the driver who tries to avoid collision with the continuous obstacle by steering operation, as compared with the case where the vehicle width Lw is small. Therefore, the greater the vehicle width Lw, the longer the operation start remaining time Tr.

In other words, when a continuous obstacle is present in the heading direction of the vehicle 10, the operation start remaining time Tr changes with the intersection line inclination a and the vehicle width Lw. Therefore, when the time threshold Tth is set to a fixed value, the operation start remaining time Tr may become smaller than the time threshold Tth in some cases. In such a case, despite that the driver intended to perform the collision avoidance operation, braking force is automatically applied to the vehicle 10, whereby the driver is highly likely to feel an unnatural sensation. In view of this, when the obstacle present in the heading direction of the vehicle 10 is a continuous obstacle, the collision avoidance ECU 20 performs "start timing adjustment processing" of determining the value of the time threshold Tth in accordance with the intersection line inclination a and the vehicle width Lw.

The time threshold Tth determined by the start timing adjustment processing will be also referred to as the "adjusted time threshold Tthr." A method of determining the adjusted time threshold Tthr by the start timing adjustment processing will be described through use of the example shown in FIG. 3. In the example shown in FIG. 3, in order to facilitate understanding, the vehicle 10 is assumed to travel straight. An obstacle 81 is present in the heading direction of the vehicle 10 (the direction of the center axis Cs). The obstacle 81 is a continuous obstacle. A side of a cross section (hatched rectangle) of the obstacle 81 shown in FIG. 3 which faces the vehicle 10 is the intersection line Lj.

First, the outline of the start timing adjustment processing will be described. The collision avoidance ECU 20 obtains, on the basis of an imaginary turn radius Rv, a collision point lapping ratio Rw which correlates with the degree of difficulty in avoiding collision with the continuous obstacle for the driver (the degree of the psychological burden on the driver). The greater the difficulty in avoiding collision, the greater the value of the collision point lapping ratio Rw. The greater the collision point lapping ratio Rw, the larger the value to which the adjusted time threshold Tthr is set by the collision avoidance ECU 20.

When the driver performs the avoidance operation by turning, the driver tends to perform the avoidance operation such that the magnitude of the inertial force (so-called "lateral G") generated as a result of turning of the vehicle 10 and acting in the x-axis direction does not exceed a certain value (reference inertial force Fbx). A turning radius which renders the magnitude of the inertial force in the x-axis direction equal to the reference inertial force Fbx is the imaginary turn radius Rv.

Since the magnitude of the inertial force in the x-axis direction is proportional to the square of the vehicle speed Vs and is inverse proportional to the turn radius of the vehicle 10, the following Expression (1) stands.

$$Fbx = k1 \times (Vs^2/Rv) \qquad (1)$$

where k1 is a constant of proportionality.

The following Expression (2) is obtained by modifying Expression (1).

$$Rv = k2 \times Vs^2 \qquad (2)$$

where k2 is a constant of proportionality equal to (k1/Fbx).

In view of the above, the collision avoidance ECU 20 calculates the imaginary turn radius Rv through computation based on Expression (2). In the present example, the reference inertial force Fbx is a value determined on the basis of inertial forces (experimental values) actually measured in a test in which a plurality of drivers performed the avoidance operation by turning.

Once the imaginary turn radius Rv is calculated, the collision avoidance ECU 20 obtains a collision position deviation ΔPx which is the distance in the x-axis direction between a vehicle-side collision point Pc and a turn collision position Pv. First, the vehicle-side collision point Pc will be described. The vehicle-side collision point Pc is a point on the vehicle 10 which first collides with the continuous obstacle if the vehicle 10 continues the travel without changing the steering angle θs. A point on the continuous obstacle which collides with the vehicle-side collision point Pc is an obstacle-side collision point Ps.

More specifically, in the case where the intersection line inclination a assumes a positive value (namely, when 0°<θg<90°), the vehicle-side collision point Pc is the front left corner Lc of the vehicle 10. Meanwhile, in the case where the intersection line inclination a assumes a negative value (namely, when −90°<θg<0°), the vehicle-side collision point Pc is the front right corner Rc of the vehicle 10. In the example of FIG. 3, since the intersection line inclination a of the obstacle 81 assumes a positive value, the vehicle-side collision point Pc is the front left corner Lc.

The absolute values of the x coordinates of the front left corner Lc and the front right corner Rc are equal to a half of the vehicle width Lw (namely, Lw/2). Accordingly, in the case where the intersection line inclination a assumes a positive value, the x coordinate Pcx of the vehicle-side collision point Pc is (−1)×Lw/2. Meanwhile, in the case where the intersection line inclination a assumes a negative value, the x coordinate Pcx of the vehicle-side collision point Pc is Lw/2.

Next, the turn collision position Pv will be described. The turn collision position Pv is the point of contact between the intersection line Lj and a "moved imaginary turn circle Ca1b obtained by moving an imaginary turn circle Ca1a in the y-axis direction such that the imaginary turn circle Ca1a comes into contact with the intersection line Lj." The imaginary turn circle Ca1a is a circle whose radius is equal to the imaginary turn radius Rv, whose center is located on a straight line La obtained by extending the axle of the rear wheels of the vehicle 10 in the x-axis direction, and which passes through the vehicle-side collision point Pc.

As shown in FIG. 3, in the case where the intersection line inclination a assumes a positive value, the collision avoidance ECU 20 obtains, as the collision position deviation ΔPx, the difference between the x coordinate Pvx of the turn collision position Pv and the x coordinate Pcx of the vehicle-side collision point Pc (namely, ΔPx=Pvx−Pcx). Further, the collision avoidance ECU 20 obtains, as the collision point lapping ratio Rw, the ratio of the collision position deviation ΔPx to the vehicle width Lw (namely, Rw=ΔPx/Lw).

Notably, in the case where the intersection line inclination a assumes a negative value, the collision avoidance ECU 20 obtains, as the collision position deviation ΔPx, the difference between the x coordinate Pcx of the vehicle-side collision point Pc and the x coordinate Pvx of the turn collision position Pv (namely, ΔPx=Pcx−Pvx). An example of this case will be described later with reference to FIG. 4.

The collision avoidance ECU 20 determines the adjusted time threshold Tthr on the basis of the vehicle speed Vs and the collision point lapping ratio Rw. Specifically, the adjusted time threshold Tthr increases as the vehicle speed Vs increases, and increases as the collision point lapping ratio Rw increases. However, the maximum value of the adjusted time threshold Tthr is smaller than the time threshold Tth.

Figure 4:
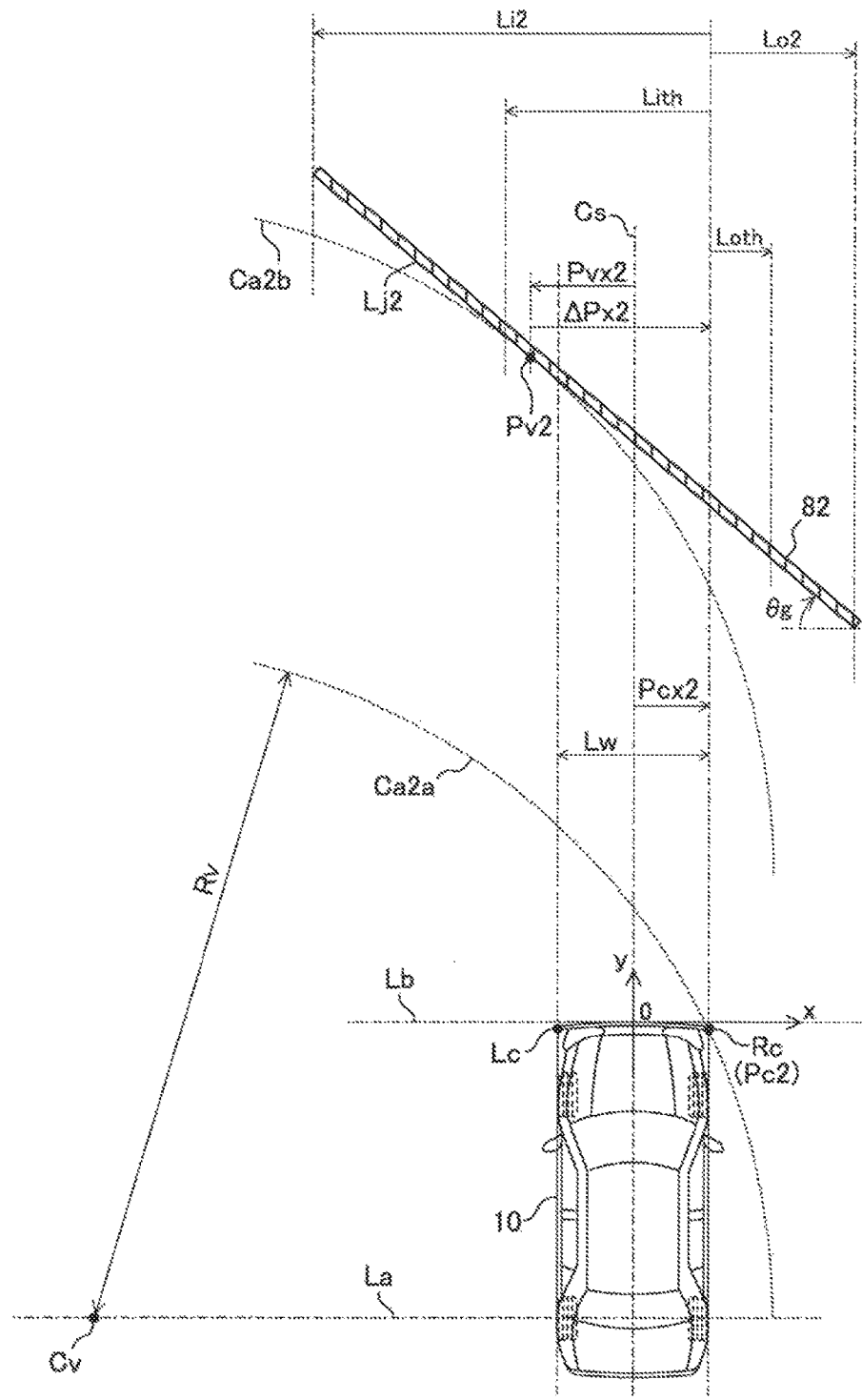
FIG. 4 is a view showing another exemplary continuous obstacle.

Example of the Case where the Intersection Line Inclination a is Negative:

FIG. 4 shows an example of the case where the intersection line inclination a assumes a negative value. In the example shown in FIG. 4, in order to facilitate understanding, the vehicle 10 is assumed to travel straight. An obstacle 82 is present in the heading direction of the vehicle 10 (the direction of the center axis Cs). The obstacle 82 is a continuous obstacle. A side of a cross section of the obstacle 82 shown in FIG. 4 which faces the vehicle 10 is the intersection line Lj2. Since the intersection line inclination a is negative, the vehicle-side collision point Pc2 is the front right corner Rc of the vehicle 10. Accordingly, the x coordinate Pcx2 of the vehicle-side collision point Pc2 is Lw/2. The magnitude of the intersection line inclination a of the obstacle 82 is smaller than the magnitude of the intersection line inclination a of the obstacle 81 shown in FIG. 3 (namely, the intersection line inclination a of the obstacle 82 is steeper than the intersection line inclination a of the obstacle 81).

The vehicle speed Vs in the example of FIG. 4 is the same as the speed of the vehicle 10 shown in the example of FIG. 3. Therefore, the imaginary turn radius Rv of an imaginary turn circle Ca2a shown in FIG. 4 is the same as that of the imaginary turn circle Ca1a. Accordingly, the imaginary turn circle Ca2a is a circle whose radius is equal to the imaginary turn radius Rv, whose center is located on the straight line La, and which passes through the vehicle-side collision point Pc (in the present example, the front right corner Rc). A moved imaginary turn circle Ca2b is obtained by moving the imaginary turn circle Ca2a in the y-axis direction such that the imaginary turn circle Ca2a comes into contact with the intersection line Lj2, whereby a turn collision position Pv2 is obtained.

Since the intersection line inclination a assumes a negative value, the difference between the x coordinate Pcx2 of the vehicle-side collision point Pc2 and the x coordinate Pvx2 of the turn collision position Pv is obtained as a collision position deviation ΔPx2 (namely, ΔPx2=Pcx2−Pvx2). Subsequently, the ratio of the collision position deviation ΔPx2 to the vehicle width Lw is obtained as the collision point lapping ratio Rw regarding the present example (namely, Rw=ΔPx2/Lw).

The collision point lapping ratio Rw may assume any of various values. For example, since the collision position deviation ΔPx regarding the obstacle 81 of FIG. 3 is smaller than the vehicle width Lw (namely, ΔPx<Lw), the collision point lapping ratio Rw is a value smaller than "1" (namely, 0<Rw<1). Meanwhile, the inclination of the obstacle 82 is steeper than that of the obstacle 81, and as a result, the collision position deviation ΔPx2 is larger than the vehicle width Lw (namely, ΔPx2>Lw). Accordingly, the collision point lapping ratio Rw is a value larger than "1" (namely, 1<Rw).

As can be understood from the examples of FIG. 3 and FIG. 4, the greater the intersection line inclination a (namely, the gentler the inclination of the continuous obstacle), the smaller the collision point lapping ratio Rw. When the inclination of the continuous obstacle becomes gentler, the collision point lapping ratio Rw may assume a negative value. An example of the case where the collision point lapping ratio Rw assumes a negative value will be described later with reference to FIG. 5.

However, in any case (namely, irrespective of the value of the collision point lapping ratio Rw), the adjusted time threshold Tthr is set such that the adjusted time threshold Tthr increases as the vehicle speed Vs increases and increases as the collision point lapping ratio Rw increases. As a result, the greater the degree of gentleness of the inclination of the continuous obstacle, the smaller the value to which the adjusted time threshold Tthr is set, and the greater the delay of the timing at which the collision avoidance assist control is started.

Figure 5:
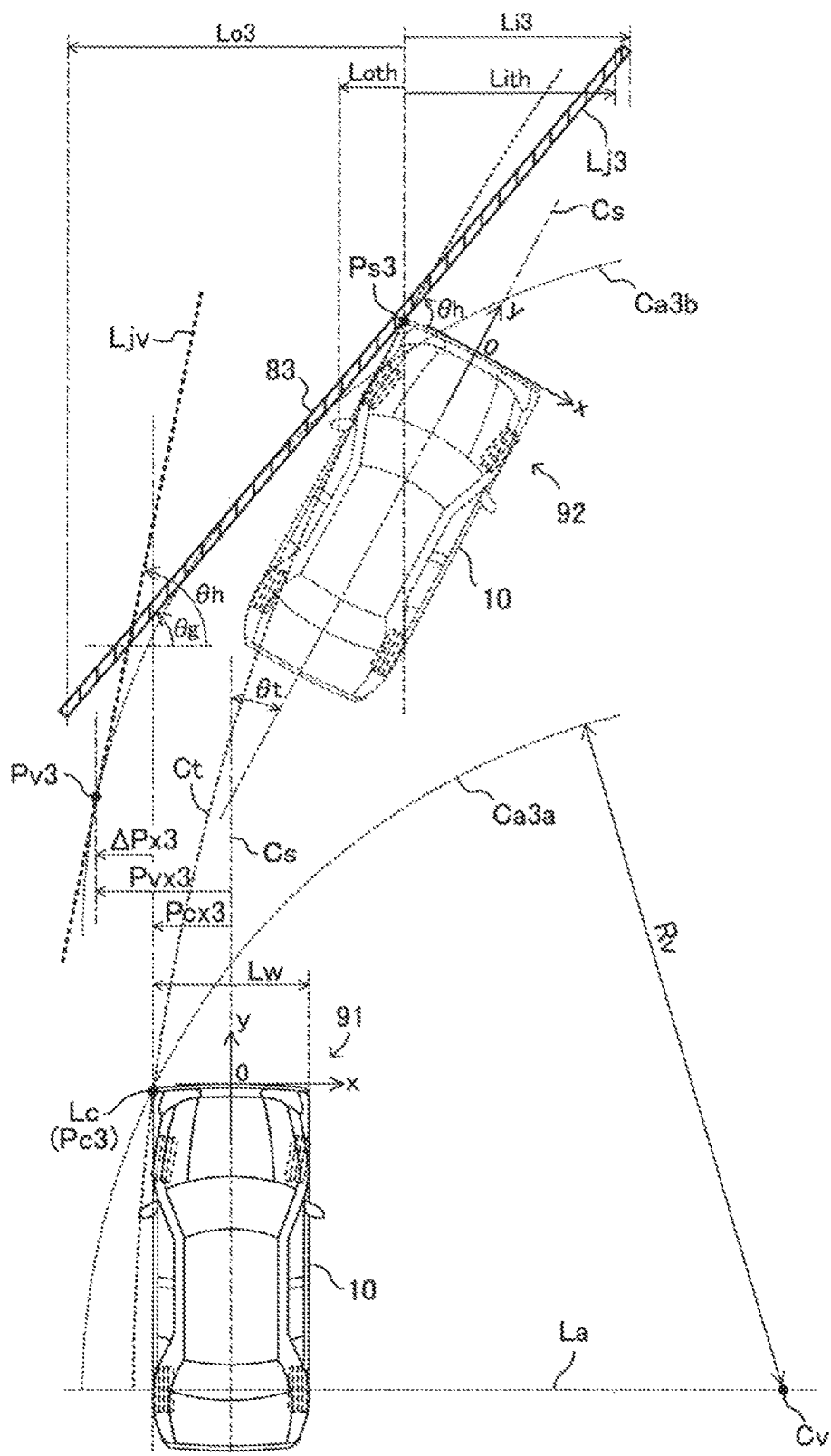
FIG. 5 is a view showing another exemplary continuous obstacle in the case where the vehicle is turning.

Start Timing Adjustment Processing at the Time of Turning:

In the above-described examples of FIG. 3 and FIG. 4, the vehicle 10 is assumed to travel straight. Namely, the steering angle θs is approximately "0." However, there exists a case where the vehicle 10 turns and a continuous obstacle is present on its predicted travel path. FIG. 5 shows an example in which the vehicle 10 approaches a continuous obstacle while turning.

In FIG. 5, the vehicle 10 is assumed to gently make a rightward turn at a vehicle position 91. The predicated travel path of the vehicle 10 (the predicted locus of the front left corner Lc) is represented by a circular arc Ct. If the driver of the vehicle 10 continues the travel without changing the steering angle θs, the front left corner Lc collides with an obstacle 83 at an obstacle-side collision point Ps3. The obstacle 83 is a continuous obstacle.

The collision avoidance ECU 20 obtains, as the collision time Tc, a time necessary for the vehicle 10 to move from the current position (in the present example, the vehicle position 91) to a position where the vehicle 10 collides with the obstacle 83 (namely, a vehicle position 92) supposing that the steering angle θs and the vehicle speed Vs do not change.

When the vehicle 10 is located at the vehicle position 91, an angle (namely, the intersection line inclination angle formed between the x axis of the vehicle 10 at the vehicle position 91 and an "intersection line Lj3 between the ground surface and the facing surface of the obstacle 83") θg which represents the inclination of the obstacle 83 in relation to the vehicle 10 is the same as the intersection line inclination angle θg representing the inclination of the obstacle 81 shown in FIG. 3.

In the case where the vehicle 10 is turning, when the collision avoidance ECU 20 obtains (sets) the collision point lapping ratio Rw, the collision avoidance ECU 20 assumes that the inclination (the angle in relation to the x axis) of the obstacle 83 is an "inclination θh of the obstacle 83 at the time when the vehicle-side collision point Pc reaches the obstacle-side collision point Ps3." The inclination θh is an acute angle formed between the intersection line Lj3 and the x axis of the vehicle 10 located at the vehicle position 92 (−90°<θh<90°).

The inclination θh is an angle obtained by adding to the intersection line inclination angle θg at the present point in time a "yaw angle difference Δθy which is the difference between a yaw angle at the time of collision with the continuous obstacle and a yaw angle at the present point in time" (namely, θh=θg+Δθy). However, the yaw angle difference Δθy assumes a positive value (namely, Δθy>0) when the vehicle 10 is turning rightward and assumes a negative value (namely, Δθy<0) when the vehicle 10 is turning leftward.

In the present example, when the vehicle 10 is located at the vehicle position 91, the collision avoidance ECU 20 obtains the collision point lapping ratio Rw by assuming that the intersection line between the road surface and the facing surface of the obstacle 83 is an "imaginary intersection line Ljv whose intersection line inclination is the inclination θh." More specifically, since the vehicle speed Vs is the same as the vehicle speed of the vehicle 10 shown in the example of FIG. 3, the imaginary turn radius Rv of an imaginary turn circle Ca3a is the same as that of the imaginary turn circle Ca1a. The imaginary turn circle Ca3a is a circle whose radius is equal to the imaginary turn radius Rv, whose center is located on the straight line La, and which passes through the vehicle-side collision point Pc3 (in the present example, the front left corner Lc).

An moved imaginary turn circle Ca3b is obtained by moving the imaginary turn circle Ca3a in the y-axis direction such that the imaginary turn circle Ca3a comes into contact with the imaginary intersection line Ljv, whereby a turn collision position Pv3 is obtained. Since the intersection line inclination a of the imaginary intersection line Ljv assumes a positive value, the difference between the x coordinate Pvx3 of the turn collision position Pv3 and the x coordinate Pcx3 of the vehicle-side collision point Pc3 is obtained as a collision position deviation ΔPx3 (namely, ΔPx3=Pvx3−Pcx3). Accordingly, the ratio of the collision position deviation ΔPx3 to the vehicle width Lw is obtained as the collision point lapping ratio Rw regarding the present example (namely, Rw=ΔPx3/Lw). In other words, since the imaginary intersection line Ljv is referred to only for the purpose of obtaining the collision point lapping ratio Rw, calculation of the intersection line intercept b of the imaginary intersection line Ljv is not required.

Since the collision point lapping ratio Rw is obtained on the basis of the value (angle) obtained by adding the yaw angle difference Δθy to the actual intersection line inclination angle θg, it becomes possible to determine the adjusted time threshold Tthr which reflects the turning state of the vehicle 10. Namely, even in the case where a continuous obstacle whose inclination is steep is present in the heading direction of the vehicle 10, if the vehicle 10 is turning in a direction for avoiding collision with that continuous obstacle, the psychological burden on the driver associated with the avoidance of collision with that continuous obstacle becomes smaller. In such a case, the adjusted time threshold Tthr is set to a smaller value.

The "direction for avoiding collision with that continuous obstacle" refers to a turning direction in which the yaw angle difference Δθy assumes a positive value when the intersection line inclination angle θg assumes a positive value, and refers to a turning direction in which the yaw angle difference Δθy assumes a negative value when the intersection line inclination angle θg assumes a negative value (namely, θg×Δθy>0).

In the examples shown in FIG. 3 and FIG. 5, respectively, the distance between a "straight line (also referred to as the "reference line" for convenience) which is located on the vehicle 10 side of the obstacle" and is parallel to the x axis and a point (also referred to as the "specific point" for convenience) on the intersection line Lj increases as the specific point moves rightward. The rightward direction in this case will also be referred to as the "specific direction" for convenience. In other words, as the specific point moves in the specific direction, the distance between the reference line and the specific point increases. Meanwhile, the distance between the reference line and the specific point on the intersection line Lj2 of FIG. 4 increases as the specific point moves leftward. In this case, the leftward direction becomes the specific direction.

The above-described processing of determining the adjusted time threshold Tthr which reflects the turning state of the vehicle 10 can be considered as processing of setting the adjusted time threshold Tthr, when the vehicle is turning in the specific direction, such that the larger the turning speed (yaw rate), the smaller the value to which the adjusted time threshold Tthr is set. In addition, the above-described processing can be considered as processing of setting the adjusted time threshold Tthr, when the vehicle 10 is turning in the direction opposite the specific direction, such that the larger the turning speed, the larger the value to which the adjusted time threshold Tthr is set.

Continuous Obstacle Conditions:

Next, the conditions for determining whether or not the obstacle is a continuous obstacle will be described. When the obstacle present in the heading direction of the vehicle 10 satisfies all the following conditions (a1) through (a3), the collision avoidance ECU 20 determines that that obstacle is a continuous obstacle.

(a1) Its turn inside length Li is greater than an inside length threshold Lith (namely, 0<Lith<Li).
(a2) Its turn outside length Lo is greater than an outside length threshold Loth (namely, 0<Loth<Lo).
(a3) The absolute value of the intersection line inclination a is larger than a lower limit threshold amin and smaller than an upper limit threshold amax (namely, 0<amin<|a|<amax).

The turn inside length Li is the distance in the x-axis direction between the obstacle-side collision point Ps and an end of the obstacle (specifically, the facing surface thereof) on the specific direction side. Meanwhile, the turn outside length Lo is the distance in the x-axis direction between the obstacle-side collision point Ps and an end of the obstacle on the side opposite the specific direction.

In the case where the intersection line inclination a assumes a positive value (namely, $0° < \theta g < 90°$), the turn inside length Li is the length in the x-axis direction of a portion of the obstacle located on the right side of the vehicle-side collision point Pc, and the turn outside length Lo is the length in the x-axis direction of a portion of the obstacle located on the left side of the vehicle-side collision point Pc. Meanwhile, in the case where the intersection line inclination a assumes a negative value (namely, $-90° < \theta g < 0°$), the turn inside length Li is the length in the x-axis direction of a portion of the obstacle located on the left side of the vehicle-side collision point Pc, and the turn outside length Lo is the length in the x-axis direction of a portion of the obstacle located on the right side of the vehicle-side collision point Pc.

In the example of FIG. 3, the intersection line inclination a assumes a positive value. Therefore, the turn inside length Li is the length in the x-axis direction of a portion of the obstacle 81 located on the right side of the vehicle-side collision point Pc (in the present example, the front left corner Lc). Meanwhile, the turn outside length Lo is the length in the x-axis direction of a portion of the obstacle 81 located on the left side of the vehicle-side collision point Pc. As can be understood from FIG. 3, the turn inside length Li is larger than the inside length threshold Lith, and the turn outside length Lo is larger than the outside length threshold Loth. Therefore, both the above-described conditions (a1) and (a2) are satisfied.

FIG. 3 shows the magnitudes of the inside length threshold Lith and the outside length threshold Loth, a lower limit angle θgmin represented by the lower limit threshold amin, and an upper limit angle θgmax represented by the upper limit threshold amax.

In the example of FIG. 3, the angle θg corresponding to the intersection line inclination a is larger than the lower limit angle θgmin and smaller than the upper limit angle θgmax (namely, θgmin<θg<θgmax). Accordingly, the above-described condition (a3) is satisfied. Since all the conditions (a1) through (a3) are satisfied, the obstacle 81 is a continuous obstacle.

The inside length threshold Lith, the outside length threshold Loth, the lower limit threshold amin, and the upper limit threshold amax are set to values determined such that when the obstacle satisfies the above-described conditions (a1) through (a3), the driver of the vehicle 10 can recognize the inclination of the facing surface. In addition, as can be understood from FIG. 3, in the present example, the inside length threshold Lith is larger than the vehicle width Lw and the outside length threshold Loth is smaller than the vehicle width Lw (Loth<Lw<Lith).

In the example of FIG. 4, the intersection line inclination a assumes a negative value. Therefore, the turn inside length Li2 is the length in the x-axis direction of a portion of the obstacle 82 located on the left side of the vehicle-side collision point Pc2 (in the present example, the front right corner Rc). Meanwhile, the turn outside length Lo2 is the length in the x-axis direction of a portion of the obstacle 82 located on the right side of the vehicle-side collision point Pc2. As can be understood from FIG. 4, the turn inside length Li2 is larger than the inside length threshold Lith, and the turn outside length Lo2 is larger than the outside length threshold Loth. Therefore, both the above-described conditions (a1) and (a2) are satisfied.

The magnitude of the angle θg in the example of FIG. 4 is larger than the lower limit angle θgmin and smaller than the upper limit angle θgmax (namely, θgmin<|θg|<θgmax). Accordingly, the above-described condition (a3) is satisfied. Since all the conditions (a1) through (a3) are satisfied, the obstacle 82 is a continuous obstacle.

As can be understood from the example of FIG. 5, when the vehicle 10 is turning, the x coordinate of the obstacle-side collision point Ps3 and the x coordinate of the vehicle-side collision point Pc3 differ from each other. Therefore, each of the x coordinate of the starting point of the turn inside length Li and the x coordinate of the starting point of the turn outside length Lo differs from the x coordinate of the vehicle-side collision point Pc.

In the example of FIG. 5, the intersection line inclination a assumes a positive value. Therefore, the turn inside length Li3 is the length in the x-axis direction of a portion of the obstacle 83 located on the right side of the obstacle-side collision point Ps3. Meanwhile, the turn outside length Lo3 is the length in the x-axis direction of a portion of the obstacle 83 located on the left side of the obstacle-side collision point Ps3. As can be understood from FIG. 5, the turn inside length Li3 is larger than the inside length threshold Lith, and the turn outside length Lo3 is larger than the outside length threshold Loth. Therefore, both the above-described conditions (a1) and (a2) are satisfied.

The angle θh in the example of FIG. 5 is larger than the lower limit angle θgmin and smaller than the upper limit angle θgmax (namely, θgmin<θh<θgmax). Accordingly, the above-described condition (a3) is satisfied. Since all the conditions (a1) through (a3) are satisfied, the obstacle 83 is a continuous obstacle.

Figure 6:
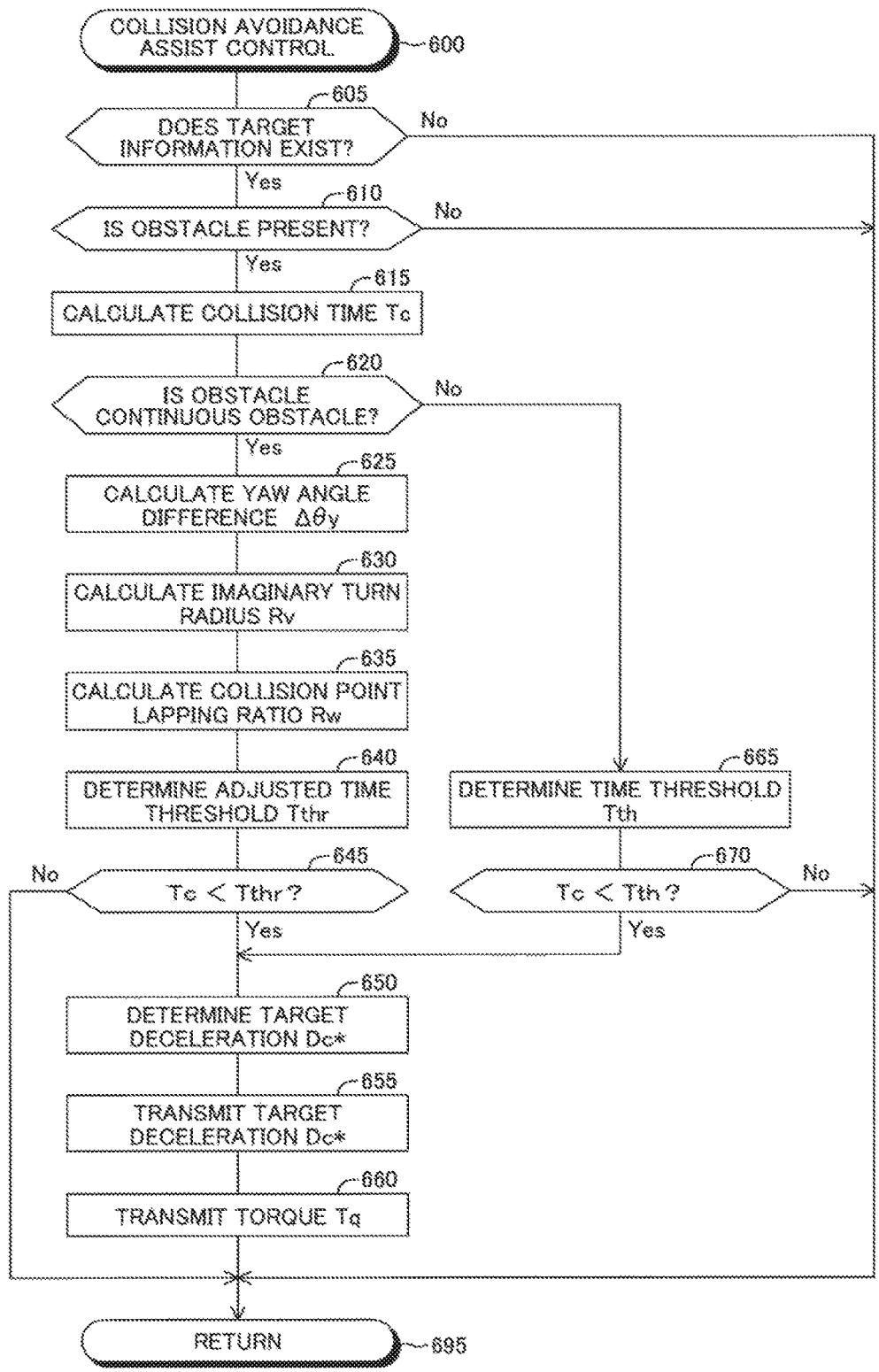
FIG. 6 is a flowchart showing a collision avoidance assist control processing routine executed by the present avoidance apparatus.

Specific Operation:

Next, the specific operation of the collision avoidance ECU 20 will be described. Every time a predetermined time elapses, the CPU 21 of the collision avoidance ECU 20 (hereinafter, also referred to as the "CPU" for simplification) executes a "collision avoidance assist control processing" routine represented by a flowchart in FIG. 6. Accordingly, when a proper timing has come, the CPU starts the processing from step 600 of FIG. 6 and proceeds to step 605 so as to determine whether or not the target information obtained by the radar unit 30 exists.

In the case where the target information does not exist, the CPU makes a "No" determination in step 605 and proceeds directly to step 695 so as to end the present routine. Meanwhile, in the case where the target information exists, the CPU makes a "Yes" determination in step 605 and proceeds to step 610 so as to determine whether or not an obstacle is present in the heading direction of the vehicle 10.

More specifically, the CPU determines that the target corresponding to that target information is an obstacle when both the following conditions (b1) and (b2) regarding the target information are satisfied.

(b1) The target information contains a target element present on a predicted travel path of the vehicle 10.

(b2) The amount of decrease in the distance between a point (center point) of the target and the vehicle 10 (distance decrease amount) per unit time is greater than a predetermined threshold. The coordinates of the center point are represented by the combination of the average of the lateral distances Dx contained in target elements constituting the target information and the average of the longitudinal distances Dy contained in the target elements constituting the target information. The distance decrease amount is calculated on the basis of the coordinates of the center point and the combination of the relative lateral speed Vx and the relative longitudinal speed Vy contained in each of the target elements constituting the target information.

For example, another vehicle (preceding vehicle) which is located on the predicted travel path of the vehicle 10 and is traveling in the same lane as the vehicle 10 does not satisfy the above-described condition (b2) because the distance decrease amount is approximately "0." Meanwhile, another vehicle (standing vehicle) which is at a standstill in the heading direction of the vehicle 10 satisfies the above-described condition (b2) because the distance decrease amount is relatively large (approximately equal to the absolute value of the vehicle speed Vs). Accordingly, the standing vehicle is an obstacle.

In the case where the target information shows the presence of an obstacle, the CPU makes a "Yes" determination in step 610 and proceeds to step 615 so as to calculate a collision time Tc which remains before collision with that obstacle. Specifically, the CPU calculates the distance (travel distance) Lp to the target element present on the predicted travel path of the vehicle 10 and calculates the collision time Tc by dividing the distance Lp by the vehicle speed Vs (namely, Tc=Lp/Vs).

Next, the CPU proceeds to step 620 and determines whether or not the obstacle is a continuous obstacle. More specifically, the CPU approximates the intersection line Lj by a straight line through use of the method of least squares. Namely, the CPU obtains the intersection line inclination a and the intersection line intercept b. Further, the CPU determines whether or not the obstacle is a continuous obstacle on the basis of the above-described conditions (a1) through (a3). In the case where the obstacle (specifically, the intersection line Lj) satisfies all the conditions (a1) through (a3), the CPU makes a "Yes" determination in step 620 and proceeds to step 625 so as to calculate the yaw angle difference $\Delta\theta y$.

Specifically, the CPU obtains the amount of change in the yaw angle $\theta y$ of the vehicle 10 per unit time (namely, yaw rate) Ry which is obtained on the basis of the steering angle $\theta s$ and the vehicle speed Vs, and calculates, as the yaw angle difference $\Delta\theta y$, the product of the yaw rate Ry and the collision time Tc (namely, $\Delta\theta y = Ry \times Tc$). For example, when the steering angle $\theta s$ is approximately "0," the yaw angle difference $\Delta\theta y$ becomes approximately "0."

Subsequently, the CPU proceeds to step 630 and calculates the imaginary turn radius Rv by substituting the vehicle speed Vs in the above-described Expression (2). The CPU then proceeds to step 635 so as to calculate the collision point lapping ratio Rw. At that time, if the yaw angle difference $\Delta\theta y$ calculated in step 625 is not approximately "0," the CPU calculates the collision point lapping ratio Rw on the basis of an angle obtaining by adding the yaw angle difference $\Delta\theta y$ to the intersection line inclination angle $\theta g$ of the continuous obstacle present in the heading direction of the vehicle 10.

Further, the CPU proceeds to step 640 and obtains the adjusted time threshold Tthr on the basis of the vehicle speed Vs and the collision point lapping ratio Rw. The relation between "the vehicle speed Vs and the collision point lapping ratio Rw" and the adjusted time threshold Tthr is stored in the ROM 22 in the form of a lookup table. The CPU obtains the adjusted time threshold Tthr by applying the vehicle speed Vs and the collision point lapping ratio Rw to this lookup table.

Subsequently, the CPU proceeds to step 645 and determines whether or not the collision time Tc is smaller than the adjusted time threshold Tthr. In the case where the collision time Tc is smaller than the adjusted time threshold Tthr, the CPU makes a "Yes" determination in step 645 and proceeds to step 650 so as to determine the target deceleration Dc* on the basis of the vehicle speed Vs and the collision time Tc.

The relation between "the vehicle speed Vs and the collision time Tc" and the target deceleration Dc* is stored in the ROM 22 in the form of a lookup table. Specifically, the higher the vehicle speed Vs, the larger the target deceleration Dc*. Further, the shorter the collision time Tc, the larger the target deceleration Dc*.

The CPU determines the target deceleration Dc* by applying the vehicle speed Vs and the collision time Tc to this lookup table. Subsequently, the CPU precedes to step 655 and transmits the target deceleration Dc* to the brake ECU 60 through the CAN 70. As a result, the brake ECU 60 controls the brake actuators 62 by executing an unillustrated routine such that the actual deceleration Dc becomes equal to the target deceleration Dc*, to thereby generate the required braking force Bf.

Subsequently, the CPU proceeds to step 660. In step 660, the CPU sets the value of the target torque Tq* to "0" and transmits the target torque Tq* to the engine ECU 50 through the CAN 70. As a result, the engine ECU 50 controls the engine actuator 52 by executing an unillustrated routine such that the actual torque Tq becomes equal to the target torque Tq*. Subsequently, the CPU proceeds to step 695.

Meanwhile, in the case where the obstacle is not a continuous obstacle (namely, one or more of the above-described conditions (a1) through (a3) are not satisfied), the CPU makes a "No" determination in step 620 and proceeds to step 665 so as to obtain the time threshold Tth on the basis of the vehicle speed Vs. The "relation between the vehicle speed Vs and the time threshold Tth" is stored in the ROM 22 in the form of a lookup table. The CPU obtains the time threshold Tth by applying the vehicle speed Vs to this lookup table.

Subsequently, the CPU proceeds to step 670 and determines whether or not the collision time Tc is smaller than the time threshold Tth. In the case where the collision time Tc is smaller than the time threshold Tth, the CPU makes a "Yes" determination in step 670 and proceeds to step 650.

Notably, in the case where the target information does not show presence of an obstacle, the CPU makes a "No" determination in step 610 and proceeds directly to step 695. In the case where the collision time Tc is equal to or greater than the adjusted time threshold Tthr, the CPU makes a "No" determination in step 645 and proceeds directly to step 695. In the case where the collision time Tc is equal to or greater than the time threshold Tth, the CPU makes a "No" determination in step 670 and proceeds directly to step 695.

Notably, in the case where the engine ECU 50 does not receive the target torque Tq* from the collision avoidance ECU 20, the engine ECU 50 determines the target torque Tq* by executing an unillustrated routine. In addition, when the brake ECU 60 does not receive the target deceleration Dc* from the collision avoidance ECU 20, the brake ECU 60 determines the required braking force Bf by executing an unillustrated routine.

As described above, the collision avoidance ECU 20 determines the adjusted time threshold Tthr on the basis of the intersection line inclination a of a continuous obstacle. Therefore, it is possible to avoid a situation in which the collision avoidance assist control is started before the driver of the vehicle 10 having become aware of the continuous obstacle starts the collision avoidance operation. Thus, the possibility of avoidance of situations in which the driver feels an unnatural sensation increases. In addition, since the collision avoidance ECU 20 determines the adjusted time threshold Tthr on the basis of the collision point lapping ratio Rw, the adjusted time threshold Tthr can be determined in consideration of the vehicle width Lw through simple computation. In addition, when the collision avoidance ECU 20 is applied to a model other than the vehicle 10 (in particular, a vehicle which differs in vehicle width from the vehicle 10), the man-hour required for adaptation can be reduced as compared with a collision avoidance ECU which does not use the collision point lapping ratio Rw.

The embodiment of the collision avoidance apparatus according to the present disclosure has been described; however, the present disclosure is not limited to the above-described embodiment, and various modifications are possible without departing from the scope of the disclosure. For example, the collision avoidance ECU 20 according to the present embodiment performs the control of decreasing the vehicle speed Vs (namely, avoidance control by braking) as the collision avoidance assist control. However, instead of or in addition to the avoidance control by braking, the collision avoidance ECU 20 may perform a control of changing the steering angle θs (namely, avoidance operation by turning). In this case, the collision avoidance ECU 20 may control the motor of an electric power steering apparatus (not shown) of the vehicle 10 so as to change the steering angle θs.

In addition, the collision avoidance ECU 20 according to the present embodiment sets the adjusted time threshold Tthr such that the adjusted time threshold Tthr increases with the vehicle speed Vs and increases with the collision point lapping ratio Rw. However, the collision avoidance ECU 20 may set the adjusted time threshold Tthr such that the adjusted time threshold Tthr increases with the collision point lapping ratio Rw irrespective of the vehicle speed Vs.

Alternatively, the collision avoidance ECU 20 may set (determine) the adjusted time threshold Tthr without calculating the collision point lapping ratio Rw. For example, the collision avoidance ECU 20 may determine the adjusted time threshold Tthr by applying the intersection line inclination a and the vehicle speed Vs at the present point in time to the relation between "the intersection line inclination a and the vehicle speed Vs" and the adjusted time threshold Tthr stored in the ROM 22 in the form of a lookup table. Alternatively, the collision avoidance ECU 20 may determine the adjusted time threshold Tthr by applying the intersection line inclination a at the present point in time to the "relation between the intersection line inclination a and the adjusted time threshold Tthr" stored in the ROM 22 in the form of a lookup table. In these cases, the larger the intersection line inclination a, the smaller value to which the adjusted time threshold Tthr is set by the collision avoidance ECU 20.

In addition, in the conditions (a1) and (a2) according to the present embodiment, the inside length threshold Lith is larger than the vehicle width Lw, and the inside length threshold Lith is larger than the outside length threshold Loth. Meanwhile, the outside length threshold Loth is smaller than the vehicle width Lw. However, the inside length threshold Lith may be smaller than the vehicle width Lw. Alternatively, the outside length threshold Loth may be equal to or larger than the inside length threshold Lith. In addition, the outside length threshold Loth may be larger than the vehicle width Lw.

In addition, the engine ECU 50 and the brake ECU 60 according to the present embodiment perform the respective collision avoidance assist controls on the basis of the target torque Tq* and the target deceleration Dc* received from the collision avoidance ECU 20. However, the engine ECU 50 and the brake ECU 60 may be configured such that even when they receive the target torque Tq* and the target deceleration Dc* from the collision avoidance ECU 20, they do not perform the respective collision avoidance assist controls if predetermined conditions are satisfied. For example, the engine ECU 50 and the brake ECU 60 may be configured such that they do not perform the respective collision avoidance assist controls when they determine, on the basis of the detection signals received from the engine sensors 51 and the brake sensors 61, that the driver has already started the collision avoidance operation.

In addition, the collision avoidance ECU 20 according to the present embodiment may determine that the obstacle is not a continuous obstacle when an error (linear approximation error) produced when the intersection line inclination a and the intersection line intercept b of the intersection line Lj are obtained by the method of least squares exceeds a predetermined threshold.

In order to detect an obstacle, the vehicle 10 according to the present embodiment includes the radar unit 30 which transmits millimeter waves. However, in place of or in addition to the radar unit 30, the vehicle 10 may have an optical camera (e.g., an infrared camera) for detecting an obstacle. Alternatively, the collision avoidance ECU 20 may detect a continuous obstacle present in the heading direction of the vehicle 10 on the basis of present position information and map information.

In addition, the collision avoidance ECU 20 according to the present embodiment obtains the yaw rate Ry on the basis of the steering angle θs and the vehicle speed Vs. However, the vehicle 10 may include a yaw rate sensor or a gyro sensor, and the collision avoidance ECU 20 may obtain the yaw rate Ry on the basis of the outputs from these sensors.

What is claimed is:
1. A collision avoidance apparatus comprising:
an obstacle detection section which detects an obstacle present in a heading direction of a vehicle;
a collision avoidance section which performs collision avoidance assist control for avoiding collision with the obstacle, the collision avoidance assist control including at least one of control of decreasing speed of the vehicle and control of turning the vehicle; and
an avoidance processing start section which causes the collision avoidance section to start the collision avoidance assist control when a collision time which is a time remaining before the vehicle collides with the obstacle becomes smaller than a predetermined time threshold, the collision avoidance apparatus further comprising a time threshold adjustment section which performs time threshold adjustment processing when the obstacle is an continuous obstacle for which a condition that a distance between a specific point on an intersection line between a road surface and a facing surface of the obstacle which faces the vehicle and a reference line which is a straight line extending in a lateral direction of the vehicle and located on the vehicle side of the facing surface increases as the specific point moves in a specific direction which is one of rightward and leftward directions of the vehicle is satisfied when the specific point is located between an obstacle-side collision point which is a point on the obstacle which first collides with the vehicle if the vehicle travels while maintaining a steering state of the vehicle at the present point in time, and a point which is separated from the obstacle-side collision point in the specific direction along the intersection line by a predetermined distance, wherein the time threshold adjustment processing sets the time threshold such that the time threshold becomes smaller than that set in a case where the obstacle is not continuous obstacle and such that the larger a magnitude of an intersection line inclination which is an acute angle formed between the intersection line and the reference line, the smaller a value to which the time threshold is set.

2. The collision avoidance apparatus according to claim 1, wherein when the time threshold adjustment section performs the time threshold adjustment processing, the time threshold adjustment section obtains a collision point lapping ratio and sets the time threshold such that the time threshold increases with the collision point lapping ratio, the collision point lapping ratio being a ratio, to a width of a body of the vehicle, of a distance in the lateral direction of the vehicle between a vehicle-side collision point and a contact point on the intersection line which is formed when a circle is moved in a longitudinal direction of the vehicle such that the circle comes into contact with the intersection line, the circle having a radius equal to a turning radius of the vehicle which turns while maintaining the speed of the vehicle at the present point in time such that an inertial force acting on the vehicle in the lateral direction becomes equal to a predetermined reference inertial force, the circle having a center located on a straight line obtained by extending a rear wheel axle of the vehicle, and the circle passing through the vehicle-side collision point which is a point on the vehicle which first collides with the obstacle-side collision point.

3. The collision avoidance apparatus according to claim 1, wherein in a case where the vehicle is turning when the time threshold adjustment section executes the time threshold adjustment processing, when a direction of the turning is the same as the specific direction, the time threshold adjustment section assumes that the magnitude of the intersection line inclination is equal to a value obtained by adding a yaw angle difference to the magnitude of the intersection line inclination, the yaw angle difference being a difference between a yaw angle of the vehicle at the time when the vehicle collides with the obstacle-side collision point and a yaw angle of the vehicle at the present point in time, and when the direction of the turning is not the same as the specific direction, the time threshold adjustment section assumes that the magnitude of the intersection line inclination is equal to a value obtained by subtracting the yaw angle difference from the magnitude of the intersection line inclination.

4. The collision avoidance apparatus according to claim 2, wherein in a case where the vehicle is turning when the time threshold adjustment section executes the time threshold adjustment processing, when a direction of the turning is the same as the specific direction, the time threshold adjustment section assumes that the magnitude of the intersection line inclination is equal to a value obtained by adding a yaw angle difference to the magnitude of the intersection line inclination, the yaw angle difference being a difference between a yaw angle of the vehicle at the time when the vehicle collides with the obstacle-side collision point and a yaw angle of the vehicle at the present point in time, and when the direction of the turning is not the same as the specific direction, the time threshold adjustment section assumes that the magnitude of the intersection line inclination is equal to a value obtained by subtracting the yaw angle difference from the magnitude of the intersection line inclination.

* * * * *

UNITED STATES PATENT AND TRADEMARK OFFICE
CERTIFICATE OF CORRECTION

PATENT NO. : 10,300,912 B2
APPLICATION NO. : 15/631643
DATED : May 28, 2019
INVENTOR(S) : Motoki Nishimura, Kotaro Saiki and Shinya Nishida It is certified that error appears in the above-identified patent and that said Letters Patent is hereby corrected as shown below:

In the Specification

In Column 17, Line 41, after "Tc=" delete "LpNs" and insert --Lp/Vs-- therefor.

Signed and Sealed this
Twenty-third Day of July, 2019

Andrei Iancu
*Director of the United States Patent and Trademark Office*